US009769509B2

(12) United States Patent
Ozaki et al.

(10) Patent No.: US 9,769,509 B2
(45) Date of Patent: Sep. 19, 2017

(54) VIDEO PLAYBACK SYSTEM AND IMAGE DISPLAY DEVICE

(71) Applicants: Hiroki Ozaki, Tokyo (JP); Taeko Ishizu, Kanagawa (JP); Ryo Iwasaki, Tokyo (JP)

(72) Inventors: Hiroki Ozaki, Tokyo (JP); Taeko Ishizu, Kanagawa (JP); Ryo Iwasaki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 175 days.

(21) Appl. No.: 14/854,442

(22) Filed: Sep. 15, 2015

(65) Prior Publication Data

US 2016/0080788 A1  Mar. 17, 2016

(30) Foreign Application Priority Data

Sep. 16, 2014 (JP) ................................ 2014-188053
Aug. 28, 2015 (JP) ................................ 2015-169221

(51) Int. Cl.
*H04N 7/173* (2011.01)
*H04N 21/258* (2011.01)
(Continued)

(52) U.S. Cl.
CPC ... *H04N 21/25825* (2013.01); *H04N 21/2343* (2013.01); *H04N 21/234363* (2013.01);
(Continued)

(58) Field of Classification Search
CPC .... H04N 7/17318; H04N 7/165; H04N 7/173; H04N 21/235; H04N 21/435
(Continued)

(56) References Cited

U.S. PATENT DOCUMENTS 6,538,705 B1 *  3/2003  Higurashi .............. G03B 37/04
                                                     315/368.12
6,771,323 B1 *  8/2004  Dean .................... G11B 27/034
                                                     348/180
(Continued)

FOREIGN PATENT DOCUMENTS

JP      2010-061542      3/2010
JP      2013-197879      9/2013

*Primary Examiner* — Annan Shang
(74) *Attorney, Agent, or Firm* — Cooper & Dunham LLP (57) ABSTRACT

A video playback system includes a first acquirer configured to acquire first specification information indicating video playback performance of an image display device; a second acquirer configured to acquire second specification information indicating video creating performance of an image supply device; a determiner configured to determine, based on the first specification information and the second specification information, either the image display device or the image supply device to be a device satisfying a playback condition; and a controller configured to, when the playback condition is changed to a new playback condition while the image display device is playing a video, cause the converter of the image display device to convert the video data into video data satisfying the new playback condition until the image display device receives video data where the new playback condition is reflected from the image supply device.

9 Claims, 5 Drawing Sheets (51) Int. Cl.
*H04N 21/2662* (2011.01)
*H04N 21/2343* (2011.01)
*H04N 21/41* (2011.01)
*H04N 21/45* (2011.01)
*H04N 21/4363* (2011.01)
*H04N 21/4402* (2011.01)

(52) U.S. Cl.
CPC ..... *H04N 21/2662* (2013.01); *H04N 21/4122* (2013.01); *H04N 21/4363* (2013.01); *H04N 21/440263* (2013.01); *H04N 21/4516* (2013.01)

(58) Field of Classification Search
USPC .... 725/87–116, 131–134, 139–142; 348/744
See application file for complete search history.

(56) References Cited

U.S. PATENT DOCUMENTS

| | | | | |
|---|---|---|---|---|
| 8,931,907 | B2* | 1/2015 | Ueno | G03B 21/14 345/77 |
| 2003/0202087 | A1* | 10/2003 | Izumi | H04N 1/00299 348/14.02 |
| 2003/0236889 | A1* | 12/2003 | Manion | H04L 29/06 709/227 |
| 2007/0165251 | A1* | 7/2007 | Byun | H04N 7/012 358/1.9 |
| 2008/0008301 | A1* | 1/2008 | Huang | H04N 7/147 379/93.07 |
| 2008/0055681 | A1* | 3/2008 | Li | H04N 1/6027 358/520 |
| 2008/0178213 | A1* | 7/2008 | Knaani | G06Q 30/06 725/37 |
| 2008/0266321 | A1* | 10/2008 | Aufranc | G03B 21/26 345/626 |
| 2009/0059096 | A1* | 3/2009 | Yamamoto | G06T 5/006 348/746 |
| 2009/0167669 | A1* | 7/2009 | Breunig | G09G 5/363 345/102 |
| 2011/0296465 | A1* | 12/2011 | Krishnan | H04N 21/4355 725/51 |
| 2012/0022924 | A1* | 1/2012 | Runnels | G06F 3/011 705/14.4 |
| 2012/0162348 | A1* | 6/2012 | Choi | H04L 1/0014 348/14.02 |
| 2013/0106908 | A1* | 5/2013 | Ichieda | G06F 3/0425 345/629 |
| 2013/0241943 | A1 | 9/2013 | Okamura | |
| 2013/0244733 | A1* | 9/2013 | Ueno | H04M 1/0214 455/566 |
| 2014/0071099 | A1* | 3/2014 | Kubota | G09G 5/006 345/179 |

\* cited by examiner

VIDEO PLAYBACK SYSTEM AND IMAGE DISPLAY DEVICE

CROSS-REFERENCE TO RELATED APPLICATION

The present application claims priority to and incorporates by reference the entire contents of Japanese Patent Application No. 2014-188053 filed in Japan on September 16, 2014 and Japanese Patent Application No. 2015-160221 filed in Japan on Aug. 28, 2015.

BACKGROUND OF THE INVENTION

1. Field of the Invention

The present invention relates to a video playback system and an image display device.

2. Description of the Related Art

Functions that transmit a video to a projector via a network and have the projector project the video are known, such as projecting a personal computer screen for transmitting a screen image of a personal computer to a projector via a network for having the projector project the screen image, and a projector complying with a standard called Miracast for transmitting a video via a wireless local area network (LAN).

Common projectors operate with limited resources (such as a central processing unit (CPU) and a memory), and processing such as projection of a video thus overloads such projectors. With these functions, a video is adjusted to a projectable size on the personal computer side before transmitted to the projector, so that the projector does not need to perform resizing or other processing. Thus, load on the projector is reduced.

A digital zooming function is installed to a projector. With this function, the size of a screen is decreased through image processing, and the projector is thus not necessarily placed at a distance when projecting an image. The digital zooming function is settable by a user at any timing. The projector therefore needs to perform reduction processing on the projected image at any timing.

When reduction processing is additionally ordered to a projector spending maximum performance for playing a video or performing another function in parallel, the projector may fail to provide enough performance. In the case of performing the reduction processing on the personal computer side instead of on the projector side, the personal computer may also fail to provide enough performance if another function is simultaneously performed in the personal computer side or the personal computer already has a large workload.

When the performance is degraded as a result of image processing required through a user operation on the projector side or other jobs ordered on the personal computer side or the projector side during playback of a video transmitted through a network, as a solution to the problem, such a method is considered for securing the performance that causes a device with smaller load to perform image processing.

Japanese Laid-open Patent Publication No. 2010-061542 describes a communication terminal that displays a content on the display unit in accordance with the specification information of the communication terminal.

When a video playback condition is changed while the video is played, a time lag is problematically caused before the changed playback condition is reflected. For example, in the case of performing reduction processing on the personal computer side for digital zooming, a time lag is caused between operation of digital zooming and projection of the data having undergone the reduction processing.

Therefore, there is a need to provide a video playback system and an image display device that, when a playback condition of a video is changed while the video is played, reduces a time lag caused before the changed playback condition is reflected.

SUMMARY OF THE INVENTION

It is an object of the present invention to at least partially solve the problems in the conventional technology.

According to an embodiment, there is provided a video playback system that includes an image supply device configured to transmit video data; an image display device configured to receive the video data and play a video according to the video data; a first acquirer configured to acquire first specification information indicating video playback performance of the image display device; a second acquirer configured to acquire second specification information indicating video creating performance of the image supply device; a determiner configured to determine, based on the first specification information and the second specification information, either the image display device or the image supply device to be a device satisfying a playback condition; and a controller configured to cause a converter of either the image display device or the image supply device determined to be the device satisfying the playback condition by the determiner to convert the video data into video data satisfying the playback condition. When the playback condition is changed to a new playback condition while the image display device is playing a video, the controller causes the converter of the image display device to convert the video data into video data satisfying the new playback condition until the image display device receives video data where the new playback condition is reflected from the image supply device.

According to another embodiment, there is provided an image display device that receives video data transmitted from an image supply device and plays a video. The image display device includes a first converter configured to convert video data into video data satisfying a playback condition; a first acquirer configured to acquire first specification information indicating video playback performance of the image display device; a second acquirer configured to acquire second specification information indicating video creating performance of the image supply device; a determiner configured to determine, based on the first specification information and the second specification information, whether a second converter of the image supply device converting video data into video data satisfying a playback condition or the first converter converts the video data; and a controller configured to cause the first converter or the second converter determined by the determiner to convert the video data into video data satisfying the playback condition. When the playback condition is changed to a new playback condition while, a video is played, the controller causes the first converting unit to convert the video data into video data satisfying the new playback condition until the image display device receives video data where the new playback. condition is reflected from the image supply device.

The above and other objects, features, advantages and technical and industrial significance of this invention. will be better understood by reading the following detailed

DETAILED DESCRIPTION OF THE PREFERRED EMBODIMENTS

Figure 1:
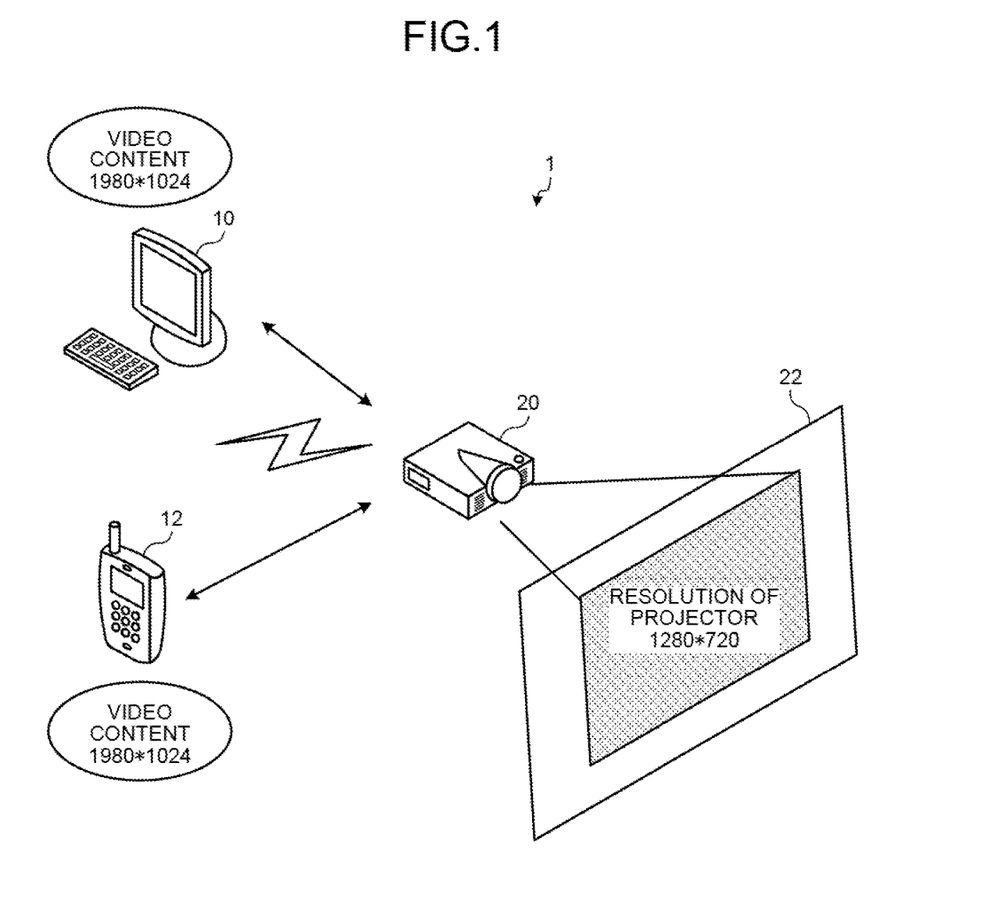
FIG. 1 is a drawing that illustrates the overall structure of a video playback system according to an embodiment.

Embodiments of a video playback system will now be described with reference to the drawings. FIG. 1 is a drawing that illustrates the overall structure of a video playback system I according to an embodiment of the present invention. As FIG. 1 illustrates, the video playback system 1 is connected with an image supply device 10 such as a personal computer (PC) that supplies as a server a video content and others, another image supply device 12 such as a mobile terminal, and an image display device 20 such as a projector with one another via wireless communication, for example. The video playback system 1 plays a video with the image display device 20 receiving video data transmitted from the image supply device 10 (or the image supply device. 12) and projecting the video data on a screen 22 or the like.

As an exemplary case, the resolution of the video data (a video content) supplied from the image supply device 10 or the image supply device 12 is 1980×1024, and the resolution of an image projected by the image display device 20 is 1280×720. The video playback system 1 therefore changes the resolution before playing the video. The specification of the video data includes the size (the height and the width) of a content, a playback frame rate, and others.

Figure 2:
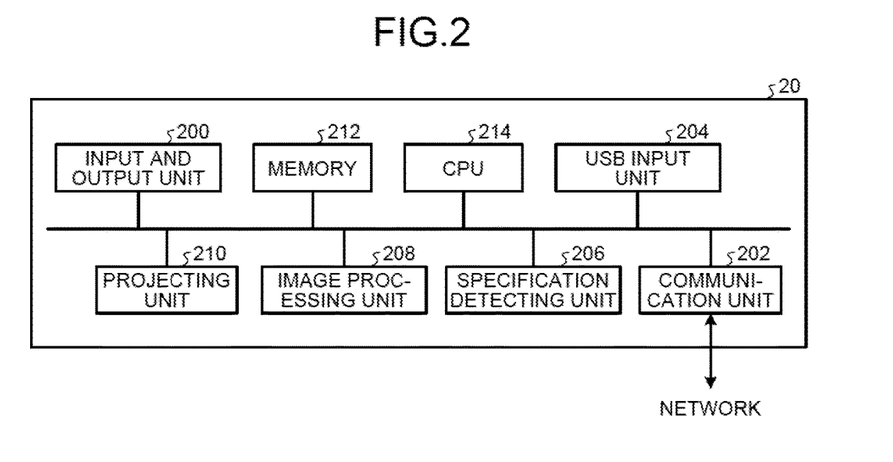
FIG. 2 is a block diagram that illustrates the general configuration of an image display device.

FIG. 2 is a block diagram that illustrates the general configuration of the image display device 20. As FIG. 2 illustrates, the image display device 20 includes, for example, an input and output unit 200, a communication unit 202, a universal serial bus (USB) input unit 204, a specification detecting unit 206, an image processing unit 208, a projecting unit 210, a memory 212, and a central processing unit (CPU) 214.

The input and output unit 200 serves as an input. and output device for the image display device 20. The communication unit 202 communicates with an external device. via a network (not illustrated). The USB input unit 204 can receive an input of video data and the like via a USB. The specification detecting unit 206 detects, for example, a specification (specification information) of each of the image display device 20 and the image supply device 10 and acquires the specification.

The image processing unit 208 performs image processing such as decoding of video data transmitted from the image supply device 10. The projecting unit 210 projects image data having undergone image processing by the image processing unit 208. The memory 212 stores therein data, a computer program, and the like processed by the image display device 20. The CPU 214 further serves as a control unit controlling each unit included in the image display device 20.

Figure 3:
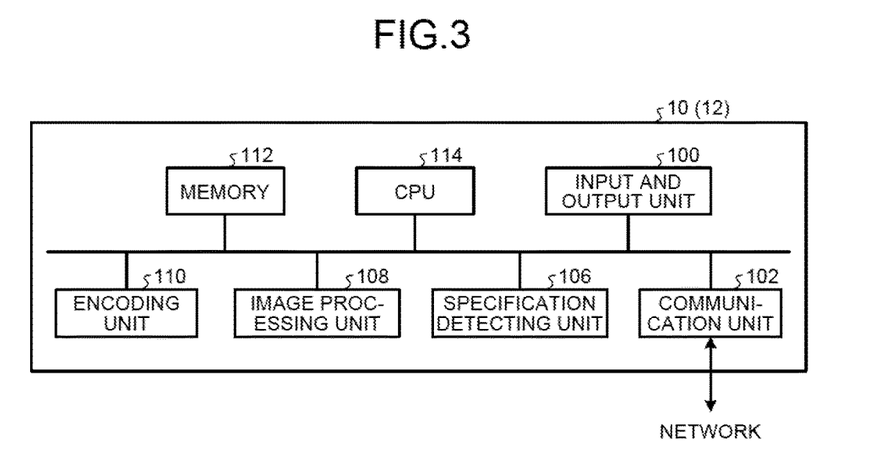
FIG. 3 is a block diagram that illustrates the general configuration of an image supply device.

FIG. 3 is a block diagram that illustrates the general configuration of the image supply device 10 (the image supply device 12). As FIG. 3 illustrates, the image supply device 10 (the image supply device 12) includes, for example, an input and output unit 100, a communication unit 102, a specification detecting unit 106, an image processing unit 108, an encoding unit 110, a memory 112, and a CPU 114.

The input and output unit 100 serves as an input and output device for the image supply device 10. The communication unit 102 communicates with an external device via a network (not illustrated). The specification detecting unit 106 detects, for example, a specification (specification information) of each of the image display device 20 and the image supply device 10 and acquires the specification.

The image processing unit 108 performs image processing such as creation of video data. The encoding unit 110 encodes video data created by the image processing unit 108. The memory 112 stores therein data, a computer program, and the like processed by the image supply device 10. The CPU 114 further serves as a control unit controlling each unit included in the image supply device 10.

Figure 4:
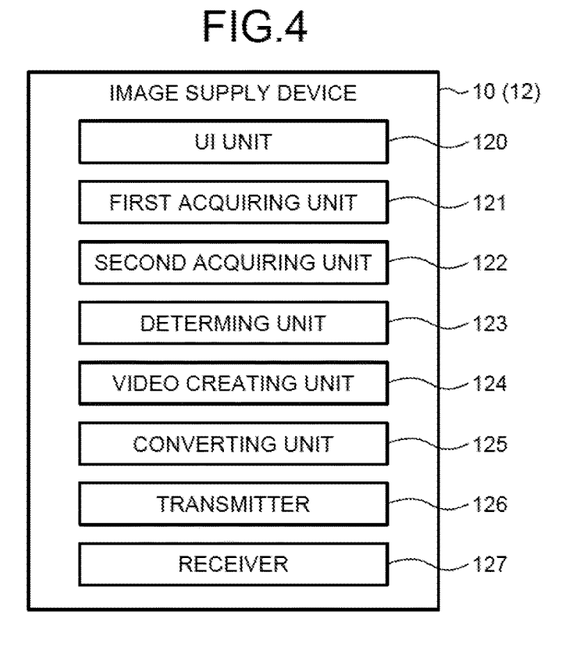
FIG. 4 is a block diagram that illustrates general functions of the image supply device.

Functions of the image supply device 10 (the image supply device 12) and the image display device 20 are now described. FIG. 4 is a block diagram that illustrates general functions of the image supply device 10 (the image supply device 12). As FIG. 4 illustrates, the image supply device 10 (the image supply device 12) includes a user interface (UI) unit 120, a first acquiring unit 121, a second acquiring unit 122, a determining unit 123, a video creating unit 124, a converting unit 125, a transmitter 126, and a receiver 127.

The UI unit 120 is implemented by, for example, the input and output unit 100. The UI unit 120 receives an operation input from a user and makes a display to the user. The first acquiring unit 121 is implemented by, for example, the specification detecting unit 106 and acquires first specification information indicating video playback performance of the image display device 20. The second acquiring unit 122 is implemented by, for example, the specification detecting unit 106 and acquires second specification information indicating video creating performance of the image supply device 10.

The determining unit 123 is implemented, for example, by the CPU 114. The determining unit 123 compares the first specification information and the second specification information with each other and determines either the image display device 20 or the image supply device 10 to be a device satisfying a playback condition of the video playback system 1. The video creating unit 124 is implemented, for example, by the image processing unit 100 and creates video data.

The converting unit 125 is implemented, for example, by the image processing unit 100 and converts video data into data satisfying the playback condition of the video playback system 1. The transmitter 126 is implemented, for example, by the communication unit 102 and transmits video data and others. The receiver 127 is implemented, for example, by the communication unit 102 and receives data and others transmitted from the image display device 20.

Figure 5:
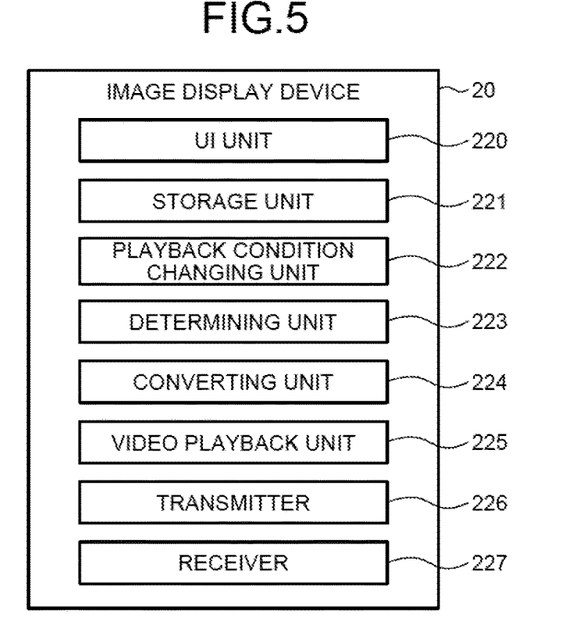
FIG. 5 is a block diagram that illustrates general functions of the image display device.

FIG. 5 is a block diagram that illustrates the general function of the image display device 20. As FIG. 5 illustrates, the image display device 20 includes a user interface (UI) unit 220, a storage unit 221, a playback condition changing unit 222, a determining unit 223, a converting unit 224, a video playback unit 225, a transmitter 226, and a receiver 227.

The UI unit 220 is implemented, for example, by the input and output unit 200. The UI unit 220 receives an operation input from a user and makes a display to the user. For example, the UI unit 220 receives an input for setting whether to cause the converting unit 125 of the image supply device 10 or the converting unit 224 of the image display device 20 to convert video data.

The storage unit 221 is implemented, for example, by the memory 212 and stores an ID and others corresponding to a newly set playback condition. The playback condition changing unit 222 is implemented, for example, by the CPU 214 and changes a playback condition for a video being played by the video playback system 1 according to the setting input by a user through the UI unit 220.

The determining unit 223 is implemented, for example, by the CPU 214 and, upon a change of the playback condition of the video being played by the video playback system 1, determines whether the image display device 20 has received video data where the newly changed playback condition is reflected from the image supply device 10.

For example, if an ID transmitted from the image supply device 10 together with video data where the new playback condition is reflected coincides with an ID stored in the storage unit 221, the determining unit 223 determines that the image display device 20 has received the video data where the new playback condition is reflected from the image supply device 10.

In the case where the image supply device 10 transmits conversion necessity information, which indicates whether the later-described converting unit 224 needs to perform a conversion, together with video data where the new playback condition is reflected, the determining unit 223 may determine that the image display device 20 has received the video data where the new playback condition is reflected from the image supply device 10 upon receipt of the conversion necessity information.

In another case, when the CPU 214 determines whether received video data satisfies the new playback condition and finds that the video data satisfies the new playback condition, the CPU 214 may determine that the image display device 20 has received video data where the new playback condition is reflected from the image supply device 10.

The converting unit 224 is implemented, for example, by the image processing unit 208 and converts video data into data satisfying a playback condition of the video playback system 1. The video playback unit 225 is implemented, for example, by the image processing unit 208 and plays a video according to a video playback condition of the video playback system 1.

The transmitter 226 is implemented, for example, by the communication unit 202 and transmits data is a network (not illustrated). The receiver 227 is implemented, for example, by the communication unit 202 and receives video data and others transmitted from the image supply device via a network (not illustrated).

A part of or all of the functions of the image supply device 10 (the image supply device 12) illustrated in FIG. 4 and the functions of the image display device 20 illustrated in FIG. 5 may be configured with either software or hardware. The software of each of the image supply device 10 (the image supply device 12) and the image display device 20 may be written in a computer-readable storage medium such as a compact disc read only memory (CD-ROM) and a digital versatile disc (DVD) as an installable or executable file and provided as a computer program product.

Figure 6:
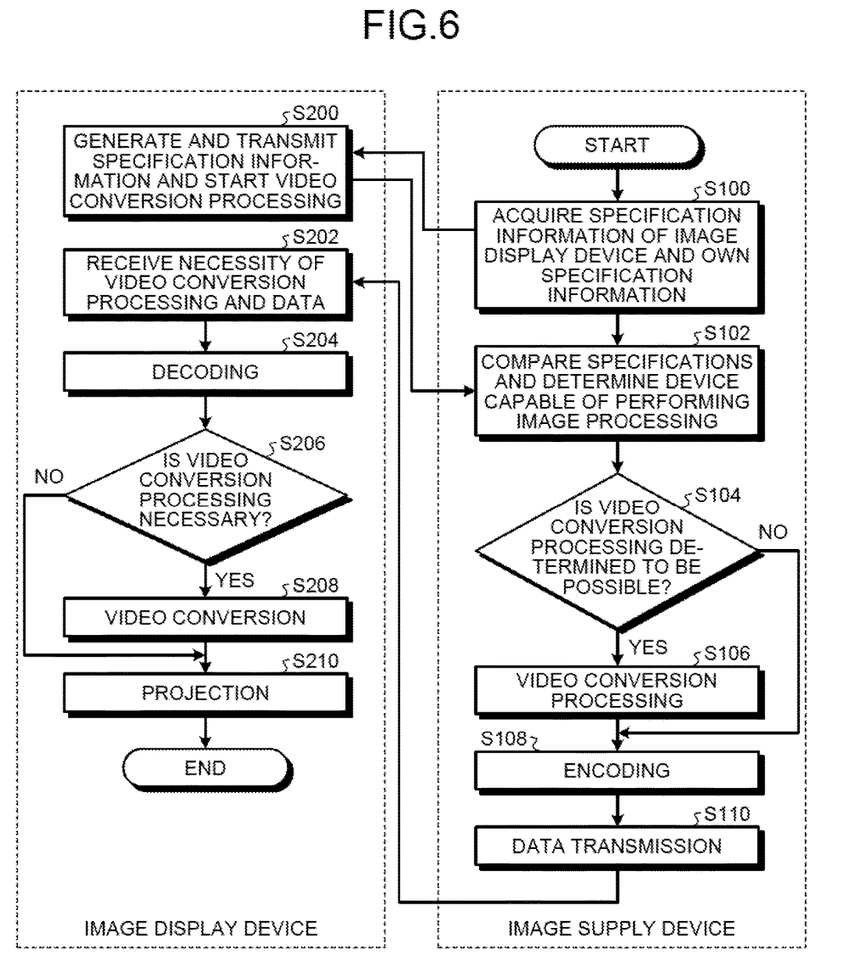
FIG. 6 is a drawing that illustrates an exemplary operation of the video playback system.

Exemplary operation of the video playback system 1 will now be described. FIG. 6 is a drawing that illustrates an exemplary operation of the video playback system 1. In such a case where a user makes an input to change (such as a change of a display area according to an instruction of digital zooming or the like) a playback condition of the video through the image display device 20 while the video playback system 1 is playing the video, the image supply device 10 acquires specification information (first specification information) of the image display device 20 and own specification information (second specification information) (S100).

Examples of the first specification information include a CPU specification, a CPU use rate, the remaining amount of memory, time for image processing (such as past results sorted by type of image processing), the type of decoding, a display area (the height and the width), and the number of Iobs under operation.

Examples of the second specification information include a CPU specification, a CPU use rate, the remaining amount of memory, time for image processing (such as past results sorted by type of image processing), and the number of jobs under operation.

The image supply device 10 compares the specifications (between the first specification information and the second specification information) and determines a device (the image supply device 10 or the image display device 20) capable of performing image processing according to the playback condition (S102).

More specifically, in the processing at S102, the image supply device 10 finds out the type of necessary video conversion processing (such as enlargement, reduction, and a change in the type of encoding) based on the specification of the content and the specification of the image display device 20. The image supply device 10 thereafter determines a device capable of providing performance that meets a playback frame rate based on the respective specifications of the image supply device 10 and the image display device 20.

The image supply device 10 may execute the processing at S102 before starting playback of the video, when the playback condition of the video is changed (such as a change of the display area upon an instruction of digital zooming), when the image display device 20 starts another job while the video is played, or when the image supply device 10 starts another job while the video is played.

The image display device 20 generates or detects specification information (the first specification information) and transmits the information to the image supply device 10. In addition to this processing, the image display device 20 performs video conversion processing for converting video data into data satisfying the playback condition based on presence or absence of an instruction from the image supply device 10. In other words, the video playback system 1 plays and projects a video by having the image, display device 20 receive video data transmitted from the image supply device 10 according to an initial playback condition.

The image supply device 10 determines whether it is possible to have the converting unit 125 or the like. convert (video conversion processing) video data into data satisfying the playback condition (S104). If the image supply device 10 determines the video conversion processing to be possible (Yes at S104), the process proceeds to the processing at S106. If the image supply device 10 determines the video conversion processing to be impossible (No at S104), the process proceeds to the processing at S100.

The image supply device 10 has the converting unit 125 or the like convert (video conversion processing) the video data into data satisfying the playback condition (S106).

The image supply device 10 has the encoding unit 110 encode the video data (S108) and has the communication unit 202 transmit the video data together with information indicating necessity of video conversion processing (S110).

The image display device 20 receives the video data and the information indicating necessity of video conversion processing by the converting unit 224 (S202) and has the image processing unit 200 or the like decode the data (S204).

The image display device 20 determines whether it is necessary to have the converting unit 224 or the like convert (video conversion processing) the video data into data satisfying the playback condition (S206). If the image display device 20 determines that the video conversion processing is necessary (Yes at S206), the process proceeds to the processing at S208. If the image display device 20 determines that the video conversion processing is unnecessary (No at S206), the process proceeds to the processing at S210.

The image display device 20 has the converting unit 224 perform the video conversion processing in the processing at S208 and projects a video according to the video data (S210).

In the video playback system 1, the image display device 20 has the converting unit 224 convert video data into data satisfying a new playback condition until the image display device 20 receives video data where the new playback condition is reflected from the image supply device 10. With this process, even when a playback condition of a video is changed while the video is played, a time lag caused before the changed playback condition is reflected can be reduced. Furthermore, if the first specification information does not meet the new playback condition, the CPU 114 or the CPU 214 controls the device not to convert the video data for the new playback condition.

The video playback system 1 in the embodiment is only an example, and the video playback system 1 is not limited to the configuration including the above-described image supply device 10 (the image supply device 12) and image display device 20. The image display device 20 may have functions of the above-described image supply device 10. Conversely, the image supply device 10 may have functions of the image display device 20. For example, the image display device 20 may include the first acquiring unit 121, the second acquiring unit 122, the determining unit 123, and others and may be configured to make a determination.

Figure 7:
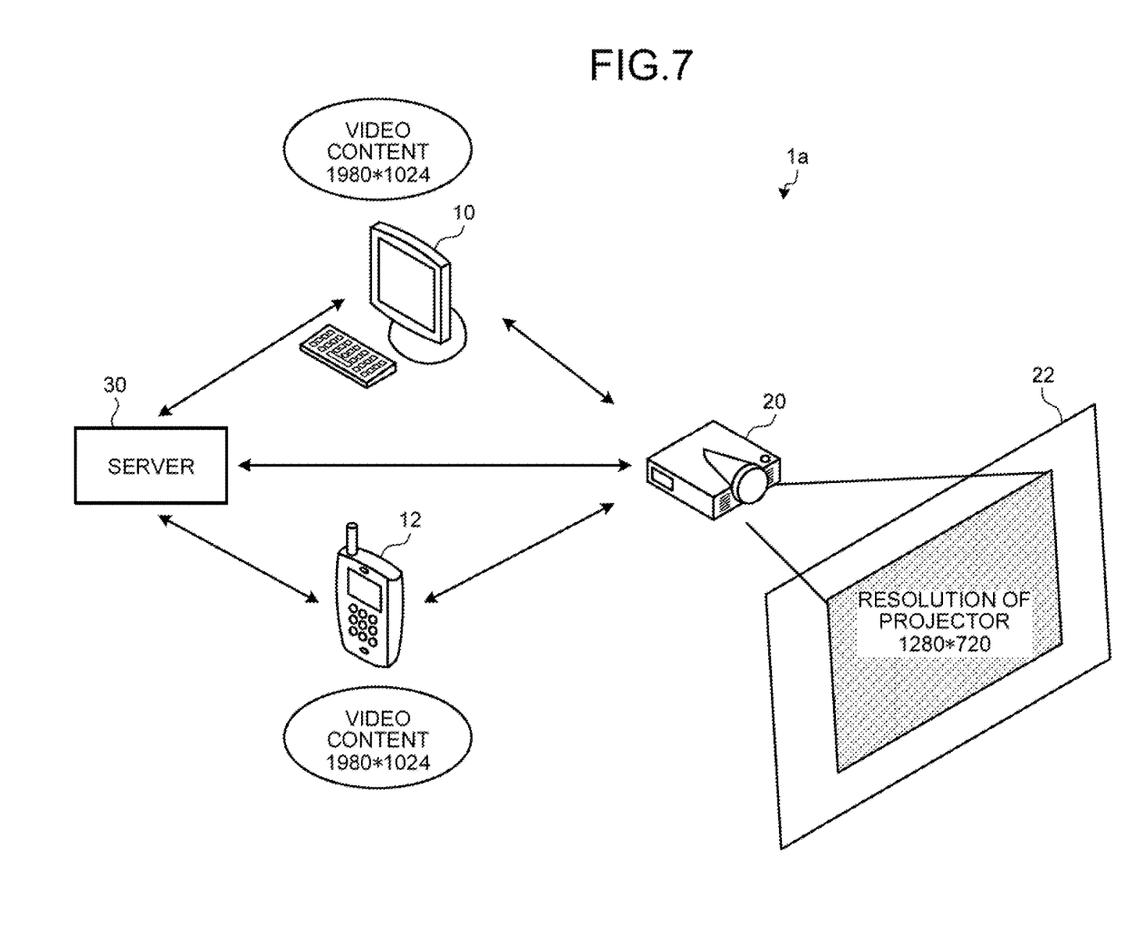
FIG. 7 is a drawing that illustrates a modification of the video playback system.

A modification of the video playback system 1 will now be described. FIG. 7 is a drawing that illustrates a modification (a video playback system 1a) of the video playback system 1. As FIG. 7 illustrates, the video playback system 1a is configured with the image supply device 10, the image supply device 12, the image display device 20, and a server 30, which are connected with one another via wireless communication or the like.

The server 30 includes a CPU and a memory and has functions of, for example, the first acquiring unit 121, the second acquiring unit 122, the determining unit 123, the converting unit 125, the transmitter 126, and the receiver 127 illustrated in FIG. 4. In this case, the first acquiring unit 121 of the server 30 may acquire the first specification information of the image display device 20, and the second acquiring unit 122 of the server 30 may acquire the second specification information of the image supply device 10 (or the image supply device 12).

The determining unit 123 of the server 30 may determine, based on the first specification information and the second specification information, either the image display device 20 or the image supply device 10 (or the image supply device 12) to be a device satisfying a playback condition. The CPU of the server 30 may cause either the converting unit 224 of the image display device 20 or the converting unit 125 of the image supply device 10 (or the image supply device 12) to convert video data into video data satisfying the playback condition. When the playback condition is changed to a new playback condition while the image display device 20 is playing the video, the CPU of the server 30 may control the converting unit 224 of the image display device 20 to convert video data into video data satisfying the new playback condition until the image display device 20 receives video data where the new playback condition is reflected.

In the video playback system 1a, the first acquiring unit 121, the second acquiring unit 122, the determining unit 123 (or the determining unit 223), and the converting unit 125 (or the converting unit 224), each of which executes a function, may be included in any of the image supply device 10, the image supply device 12, the image display device 20, and the server 30.

According to the present invention, such an effect is exerted that, when a playback condition of a video is changed while the video is played, reduces a time lag caused before the changed playback condition is reflected.

Although the invention has been described with respect to specific embodiments for a complete and clear disclosure, the appended claims are not to be this limited but are to be construed as embodying all modifications and alternative. constructions that may occur to one skilled in the art that fairly fall within the basic teaching herein set forth.

What is claimed is:

1. A video playback system comprising
    an image supply device configured to transmit video data;
    an image display device configured to receive the video data and play a video according to the video data;
    a first acquirer configured to acquire first specification information indicating video playback performance of the image display device;
    a second acquirer configured to acquire second specification information indicating video creating performance of the image supply device;
    a determiner configured to determine, based on the first specification information and the second specification information, either the image display device or the image supply device to be a device satisfying a playback condition; and
    a controller configured to cause a converter of either the image display device or the image supply device determined to be the device satisfying the playback condition by the determiner to convert the video data into video data satisfying the playback condition, wherein
    when the playback condition is changed to a new playback condition while the image display device is playing a video, the controller causes the converter of the image display device to convert the video data into video data satisfying the new playback condition until the image display device receives video data where the new playback condition is reflected from the image supply device.

2. The video playback system according to claim 1, wherein
    the image display device includes a storage unit configured to store an ID corresponding to the new playback condition, and when an ID transmitted from the image supply device along with video data where the new playback condition is reflected coincides with the ID stored in the storage unit, the controller determines that the image display device has received the video data where the new playback condition is reflected from the image supply device.

3. The video playback system according to claim 1, wherein when transmitting the video data where the new playback condition is reflected, the image supply device transmits conversion necessity information that indicates whether the converter of the image display device needs to perform a conversion, and upon receipt of the conversion necessity information, the image display device determines that the image display device has received the video data where the new playback. condition is reflected from the image supply device.

4. The video playback system according to claim 1, wherein the controller determines whether the video data received by the image display device satisfies the new playback condition, and when the new playback condition is satisfied, the controller determines that the image display device has received the video data where the new playback condition is reflected from the image supply device.

5. The video playback system according to claim 1, wherein the new playback condition includes a change of a display area.

6. The video playback system according to claim 1, wherein the new playback condition includes a change of a playback frame rate.

7. The video playback system according to claim 1, wherein the controller does not convert video data for the new playback condition when the first specification information does not satisfy the new playback condition.

8. The video playback system according to claim 1, further comprising a user interface configured to receive an input for setting whether to have respective converting units of the image supply device and the image display device convert the video data.

9. An image display device that receives video data transmitted from an image supply device and plays a video, the image display device, comprising:

a first converter configured to convert video data into video data satisfying a playback condition;

a first acquirer configured to acquire first specification information indicating video playback performance of the image display device;

a second acquirer configured to acquire second specification information indicating video creating performance of the image supply device;

a determiner configured to determine, based on the first specification information and the second specification information, whether a second converter of the image supply device converting video data into video data satisfying a playback condition or the first converter converts the video data; and a controller configured to cause they first converting unit or the second converter determined by the determiner to convert the video data into video data satisfying the playback condition, wherein when the playback condition is changed to a new playback condition while a video is played, the controller causes the first converter to convert the video data into video data satisfying the new playback condition until the image display device receives video data where the new playback condition is reflected from the image supply device.

\* \* \* \* \*